(12) United States Patent
Ohtsu et al.

(10) Patent No.: US 7,684,153 B2
(45) Date of Patent: Mar. 23, 2010

(54) MAGNETIC HEAD SLIDER WITH GROUND AND HEATER TERMINAL ARRANGEMENT AND MAGNETIC HEAD ASSEMBLY

(75) Inventors: Takayoshi Ohtsu, Kanagawa (JP); Nobumasa Nishiyama, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 711 days.

(21) Appl. No.: 11/439,687

(22) Filed: May 23, 2006

(65) Prior Publication Data
US 2006/0268459 A1 Nov. 30, 2006

(30) Foreign Application Priority Data
May 24, 2005 (JP) ............................. 2005-150524

(51) Int. Cl.
*G11B 5/48* (2006.01)
*G11B 5/33* (2006.01)
(52) U.S. Cl. ................ 360/234.5; 360/245.8; 360/294.7
(58) Field of Classification Search .............. 360/234.5, 360/245.8, 245.9, 246, 294.7, 125.3, 125.31, 360/125.71, 125.75
See application file for complete search history.

(56) References Cited

U.S. PATENT DOCUMENTS

| | | | |
|---|---|---|---|
| 6,839,204 B2 | 1/2005 | Shiraishi et al. | |
| 6,927,951 B2 * | 8/2005 | Huha et al. | 360/323 |
| 7,064,928 B2 * | 6/2006 | Fu et al. | 360/234.5 |
| 7,099,117 B1 * | 8/2006 | Subrahmanyam et al. | 360/245.9 |
| 2003/0099054 A1 | 5/2003 | Kamijima | |
| 2004/0022169 A1 * | 2/2004 | Ichikawa et al. | 369/244 |
| 2005/0254172 A1 * | 11/2005 | Ichikawa et al. | 360/234.5 |
| 2006/0171076 A1 * | 8/2006 | Lille | 360/234.5 |
| 2007/0258171 A1 * | 11/2007 | Ohtsu | 360/326 |
| 2008/0014467 A1 * | 1/2008 | Ohtsu et al. | 428/811.4 |
| 2008/0080096 A1 * | 4/2008 | Miura | 360/245.8 |
| 2008/0170326 A1 * | 7/2008 | Feng et al. | 360/99.04 |

* cited by examiner

*Primary Examiner*—Jefferson Evans
(74) *Attorney, Agent, or Firm*—Townsend and Townsend and Crew LLP; Rambod Nader (57) ABSTRACT

Crosstalk from a write signal on wiring on a suspension needs to be reduced since an ESD withstand voltage is decreased due to high sensitivity of a GMR head. In one embodiment, a terminal arrangement on an element-forming surface of a magnetic head slider consists of a ground terminal G, a read terminal R+, a read terminal R−, a write terminal W+ and a write terminal W− in order from the outside. With this terminal arrangement, the wiring order on a suspension consists of a read wire R−, a read wire R+, a ground line G, a write wire W− and a write wire W+ in an arrangement unlike the terminal arrangement. In other words, the ground line G is interposed between the write wires W and the read wires R. In this way, the wiring of the write wire W and the wiring of the read wire R are never arranged adjacently to each other, and further, the ground line G is interposed between the write wires W and the read wires R, thereby reducing crosstalk on the read wires R caused by a writing current with a high frequency which flows in the write wires W.

10 Claims, 8 Drawing Sheets

MAGNETIC HEAD SLIDER WITH GROUND AND HEATER TERMINAL ARRANGEMENT AND MAGNETIC HEAD ASSEMBLY

CROSS-REFERENCES TO RELATED APPLICATIONS

This application claims priority from Japanese Patent Application No. JP2005-150524, filed May 24, 2005, the entire disclosure of which is incorporated herein by reference.

BACKGROUND OF THE INVENTION

The present invention relates to a magnetic head slider for achieving high recording density in a magnetic disk drive and a magnetic head assembly for supporting the magnetic head slider by a suspension and, more particularly, to a magnetic head slider and a magnetic head assembly with a reduced influence of crosstalk or the like between write element wiring and read element wiring.

A spin valve element utilizing a giant magnetoresistive effect (abbreviated as "a GMR") has been put to practical use as a read element in a magnetic disk drive. Read-sensitivity has been enhanced with improved recording density. However, this has caused a problem of electrostatic damage (ESD) during a fabrication process. The electrostatic damage such as a waveform fluctuation or an increase in noise in addition to an electrical breakdown or fusion raises a serious problem from the viewpoint of not only the head yield but also reliability. Measures against the electrostatic damage have been proposed such as a method for shorting a circuit between lead terminals in a GMR head on a suspension to thus open the circuit before completion of assembly, a method for inserting resistance between lead terminals in a GMR head to thus shunt a current, and the like.

However, the above-described measures cannot produce any effect with respect to an influence of crosstalk on a transmission line after the fabrication process. That is to say, it is necessary to reduce the influence of crosstalk from a write signal through the wiring on a suspension according to a decrease in ESD withstand voltage in the GMR head. Patent document 1 (Japanese Patent Laid-open No. 2002-93093) discloses a ground (abbreviated as "GND") pattern or a power source voltage (Vcc) pattern is interposed between first and second adjacent lead conductor patterns serving as wiring members on a suspension in order to prevent any variation in characteristics or breakage of a read head element even in the case of use of a write current having abrupt rise and fall.

BRIEF SUMMARY OF THE INVENTION

The GMR head requires two lead wires to be connected to a magnetic write element and two lead wires to be connected to a magnetic read element. Further, the GMR head requires wiring be connected a heat-generating resistor or a heat element for TFC (i.e., Thermal Flyheight Control). Moreover, the reduced distance between the GMR head and a magnetic disk needs to prevent electrostatic discharge, that is, wiring is required which connects a slider, the magnetic write element and the magnetic read element to the ground. Therefore, as many as five to eight pieces of wiring are needed to increase the number of terminals to be connected to the wiring. In the same manner, the number of wiring on the suspension to be connected to the terminals is increased. As a consequence, an interval between the wiring must be further narrowed. Therefore, the problem of the crosstalk between the wiring for the magnetic write element and the wiring for the magnetic read element has become more serious.

A feature of the present invention is to provide a magnetic head slider capable of reducing crosstalk occurring between wiring for a magnetic write element and a wiring for a magnetic read element.

Another feature of the present invention is to provide a magnetic head assembly with reduced crosstalk occurring between wiring for a magnetic write element and wiring for a magnetic read element.

A magnetic head slider according to an aspect of the present invention comprises: a substrate; a magnetic read element and a magnetic write element formed on the substrate; and a terminal arrangement structure including a first terminal for wiring the magnetic read element, a second terminal for wiring the magnetic write element and a ground terminal for a ground line with respect to any or all of the substrate, the magnetic read element and the magnetic write element; wherein the ground terminal is disposed outside the first terminal and the second terminal in the terminal arrangement structure.

In some embodiments, there are two first terminals, two second terminals, and one ground terminal. The terminal arrangement structure is formed on the insulating layer formed over the magnetic write element, and the first, second and ground terminals are arranged in a line, the ground terminal being arranged outside the arrangement of the first and second terminals.

A magnetic head slider according to another aspect of the present invention comprises: a substrate; a heat element formed on the substrate via an insulating layer; a magnetic read element and a magnetic write element formed on the heat element via the insulating layer; and a terminal arrangement structure including a first terminal for wiring the magnetic read element, a second terminal for wiring the magnetic write element, a third terminal for wiring the heat element and a ground terminal for a ground line with respect to any or all of the substrate, the magnetic read element, the magnetic write element and the heat element; wherein the ground terminal and the third terminal are arranged on both sides of the first and second terminals, respectively, in the terminal arrangement structure.

In some embodiments, there are two first terminals, two second terminals, one third terminal, and one ground terminal. The terminal arrangement structure is formed on the insulating layer formed over the magnetic write element, and the first, second, third and ground terminals are arranged in a line, the ground terminal and the third terminal being arranged on both sides of the arrangement of the first and second terminals, respectively.

A magnetic head assembly according to another aspect of the present invention comprises: a magnetic head slider including a substrate; a magnetic read element and a magnetic write element formed on the substrate; and a terminal arrangement structure having a first terminal for wiring the magnetic read element, a second terminal for wiring the magnetic write element and a ground terminal for a ground line with respect to any or all of the substrate, the magnetic read element and the magnetic write element, the ground terminal being arranged outside the first terminal and the second terminal. A suspension includes a wiring structure for guiding, in a desired direction, a first wiring to be connected to the first terminal, a second wiring to be connected to the second terminal and a ground line to be connected to the ground terminal in the magnetic head slider and separating the first wiring from the second wiring other by locating the ground line at the center thereof.

In some embodiments, there are two first terminals, two second terminals, and one ground terminal. The terminal arrangement structure is formed on the insulating layer formed over the magnetic write element, and the first, second and ground terminals are arranged in a line, the ground terminal being arranged outside the arrangement of the first and second terminals.

A magnetic head assembly according to another aspect of the present invention comprises: a magnetic head slider including a substrate; a heat element formed on the substrate via an insulating layer; and a magnetic read element and a magnetic write element formed on the heat element via the insulating layer, and a terminal arrangement structure having a first terminal for wiring the magnetic read element, a second terminal for wiring the magnetic write element, a third terminal for wiring the heat element and a ground terminal for a ground line with respect to any or all of the substrate, the magnetic read element, the magnetic write element and the heat element, the ground terminal and the third terminal being arranged on both sides of the first and second terminals. A suspension includes a wiring structure for guiding, in a desired direction, a first wiring to be connected to the first terminal, a second wiring to be connected to the second terminal, a third wiring to be connected to the third terminal and a ground line to be connected to the ground terminal in the magnetic head slider and separating the first wiring from the second wiring by locating the ground line and the third wiring at the center thereof.

In some embodiments, there are two first terminals, two second terminals, one third terminal, and one ground terminal. The terminal arrangement structure is formed on the insulating layer formed over the magnetic write element, and the first, second, third and ground terminals are arranged in a line, the ground terminal and the third terminal being arranged on both sides of the arrangement of the first and second terminals, respectively.

According to the present invention, there can be provided a magnetic head slider capable of reducing crosstalk occurring between wiring for a magnetic write element and wiring for a magnetic read element. Moreover, according to the present invention, there can be provided a magnetic head assembly, in which crosstalk occurring between wiring for a magnetic write element and wiring for a magnetic read element can be reduced.

DETAILED DESCRIPTION OF THE INVENTION

Figure 1:
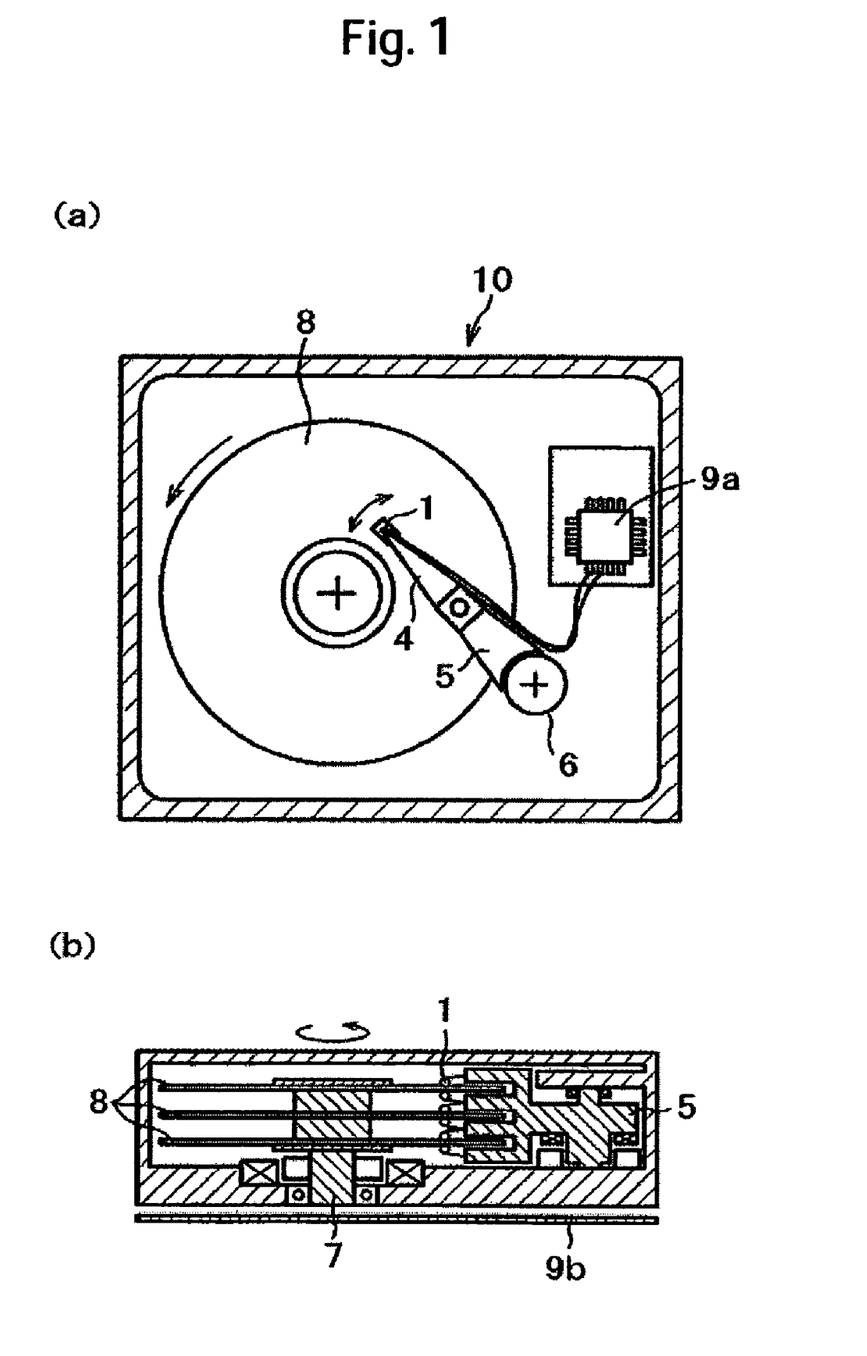
FIG. 1 includes views showing the constitution of a magnetic disk drive, on which a magnetic head assembly according to the present invention is mounted.

An embodiment according to the present invention will be described below in reference to the accompanying drawings. FIG. 1 includes views showing a magnetic disk drive on which a magnetic head assembly in an embodiment according to the present invention is mounted; wherein FIG. 1(a) is a plan view showing a state in which a cover is detached and FIG. 1(b) is a cross-sectional view showing a spindle motor and a rotary actuator. A magnetic disk drive 10 writes and reads a magnetization signal at a desired position on a magnetic disk 8 turned by a spindle motor 7 by means of a magnetic head 2 (see FIG. 3) mounted on a magnetic head slider 1 fixed to the tip of a suspension 4. The suspension 4 is supported by a rotary actuator 6 via an arm 5. A position (i.e., a track) of the magnetic head 2 in a radial direction of the magnetic disk can be selected by driving the rotary actuator 6. A write signal to the magnetic head 2 and a read signal from the magnetic head 2 are processed in corresponding signal processing circuits 9a and 9b, respectively.

Figure 2:
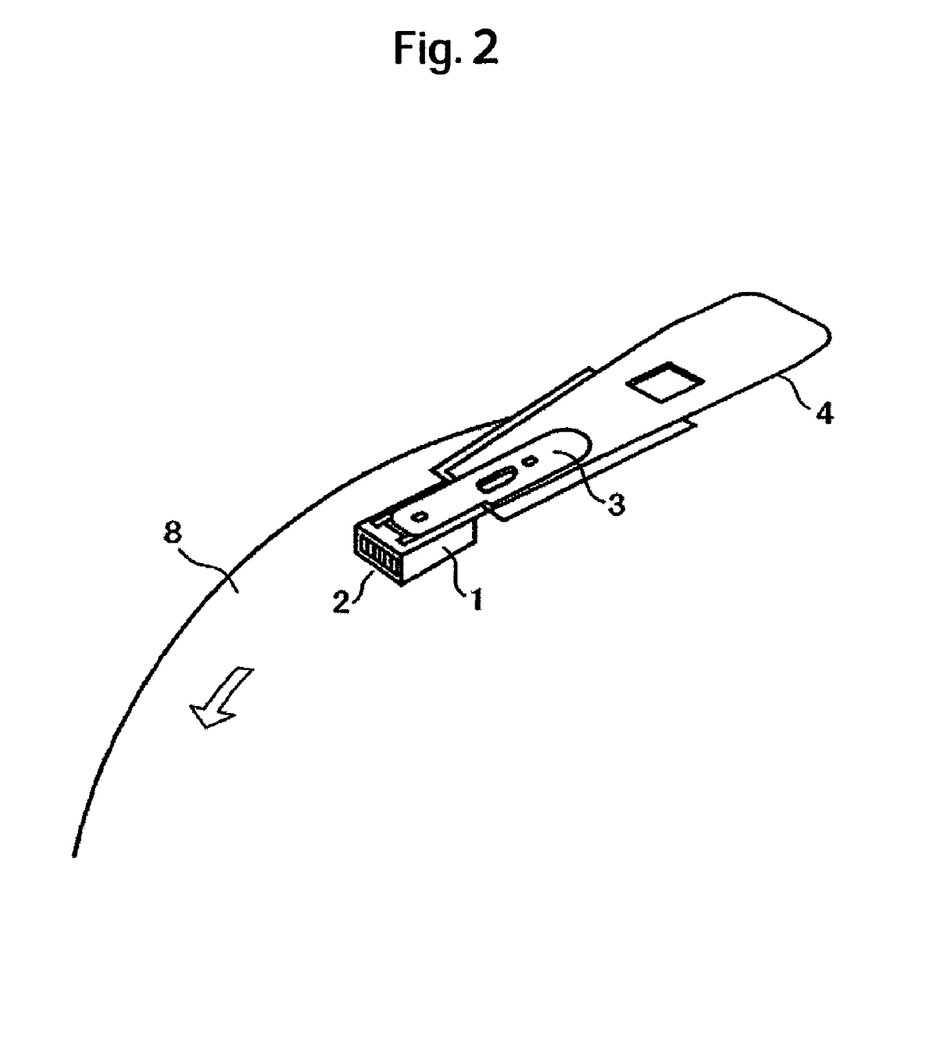
FIG. 2 is a view showing the outside appearance of a magnetic head slider and a magnetic head assembly in one embodiment according to the present invention.

FIG. 2 is an outline view of the magnetic head slider and the magnetic head assembly in one embodiment according to the present invention. The magnetic head assembly includes the magnetic head slider 1 having the magnetic head 2 formed thereat, a flexure 3 for supporting the magnetic head slider 1, and the suspension 4 to which one end of the flexure 3 is fixed. The magnetic head 2 is a GMR head or a TMR head, which is formed at an element-forming surface on a leading side of the magnetic head slider 1. A protective film comprising an insulator is formed over the magnetic head 2 formed at the element-forming surface. Furthermore, on the protective film, terminals to which lead wires for the magnetic write element and the magnetic read element in the magnetic head 2 are connected. In FIG. 2, the magnetic head 2 is not shown but five terminals are shown.

Figure 3:
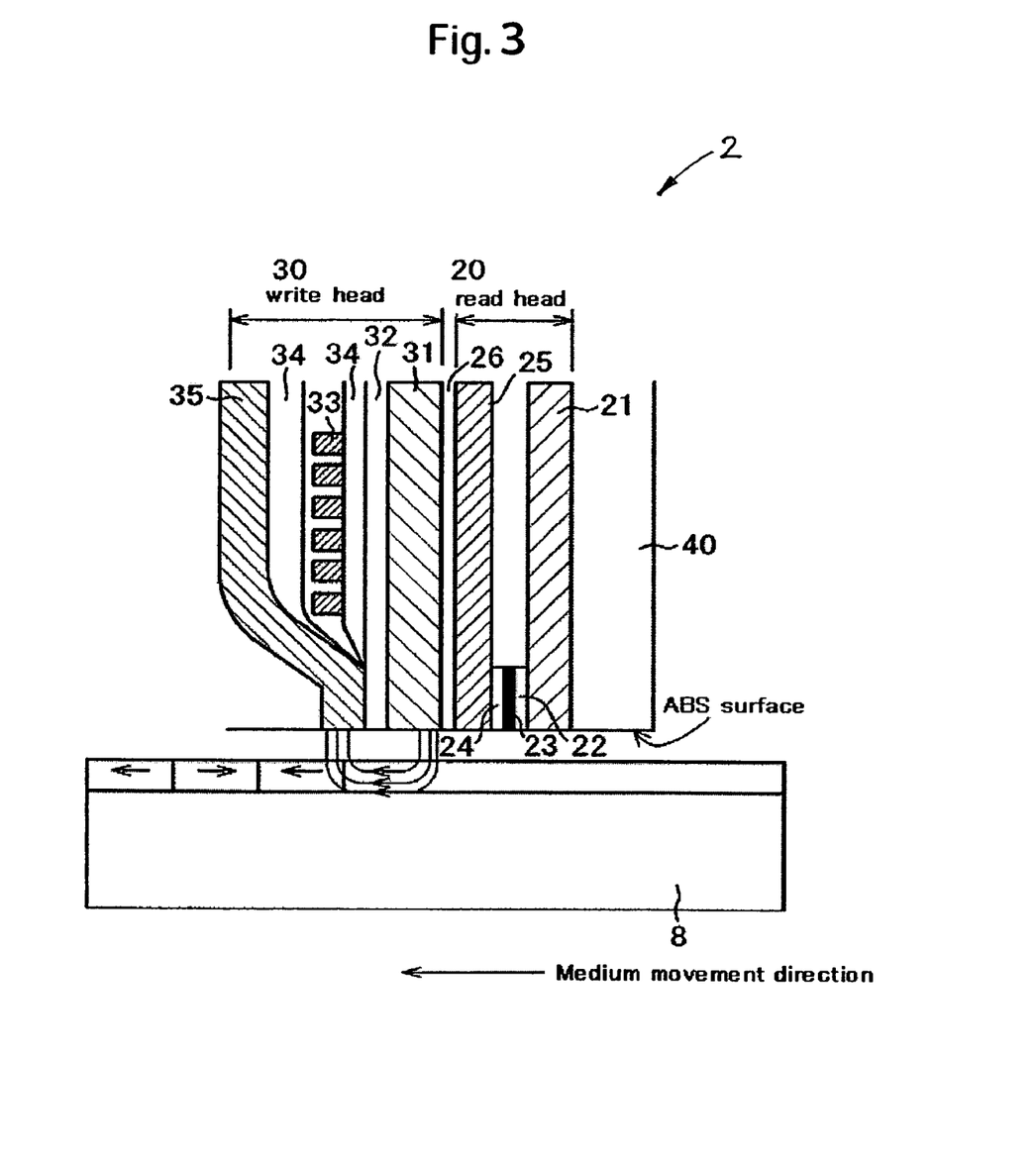
FIG. 3 is a view of a magnetic head of a longitudinal magnetic recording system, as viewed in a cross-sectional direction of a magnetic disk.

FIG. 3 is a view showing a magnetic head of a longitudinal magnetic recording system, as viewed in a cross-sectional direction of a magnetic disk. A read head 20 includes a lower magnetic shield 21 and an upper magnetic shield 25 on a substrate (i.e., a slider) 40, and further, has a magnetic read element (i.e., a GMR element) 23 held between a lower gap layer 22 and an upper gap layer 24 put between the magnetic shields 21 and 25. An insulating separation layer 26 is laminated on the upper magnetic shield 25. In the meantime, a write head 30 includes a lower magnetic pole piece 31, an upper magnetic pole piece 35, a magnetic gap layer 32 interposed between the magnetic pole pieces 31 and 35 and defining a magnetic gap at an ABS surface facing the magnetic disk 8, and a coil 33 formed inside interlayer insulating layers 34. Any or all of the substrate (slider) 40, the GMR element 23, and the upper and lower magnetic shields 25 and 21 in the read head 20, and the upper and lower magnetic pole pieces 35 and 31 in the write head 30 are connected to a ground terminal, not shown, at a proper resistance of about 3 KΩ. As shown in FIG. 3, in the longitudinal recording system, a magnetic flux leaking from the lower magnetic pole piece 31 magnetizes an orbital track on the magnetic disk 8 in a longitudinal direction during a write operation. In contrast, during a read operation, a magnetic flux leaking from a magnetized region on the turning magnetic disk 8 is injected into the GMR element 23 in the read head 20, thereby causing a change in resistance inside the GMR element 23. The change in resistance is detected as a change in current or a change in voltage.

Figure 4:
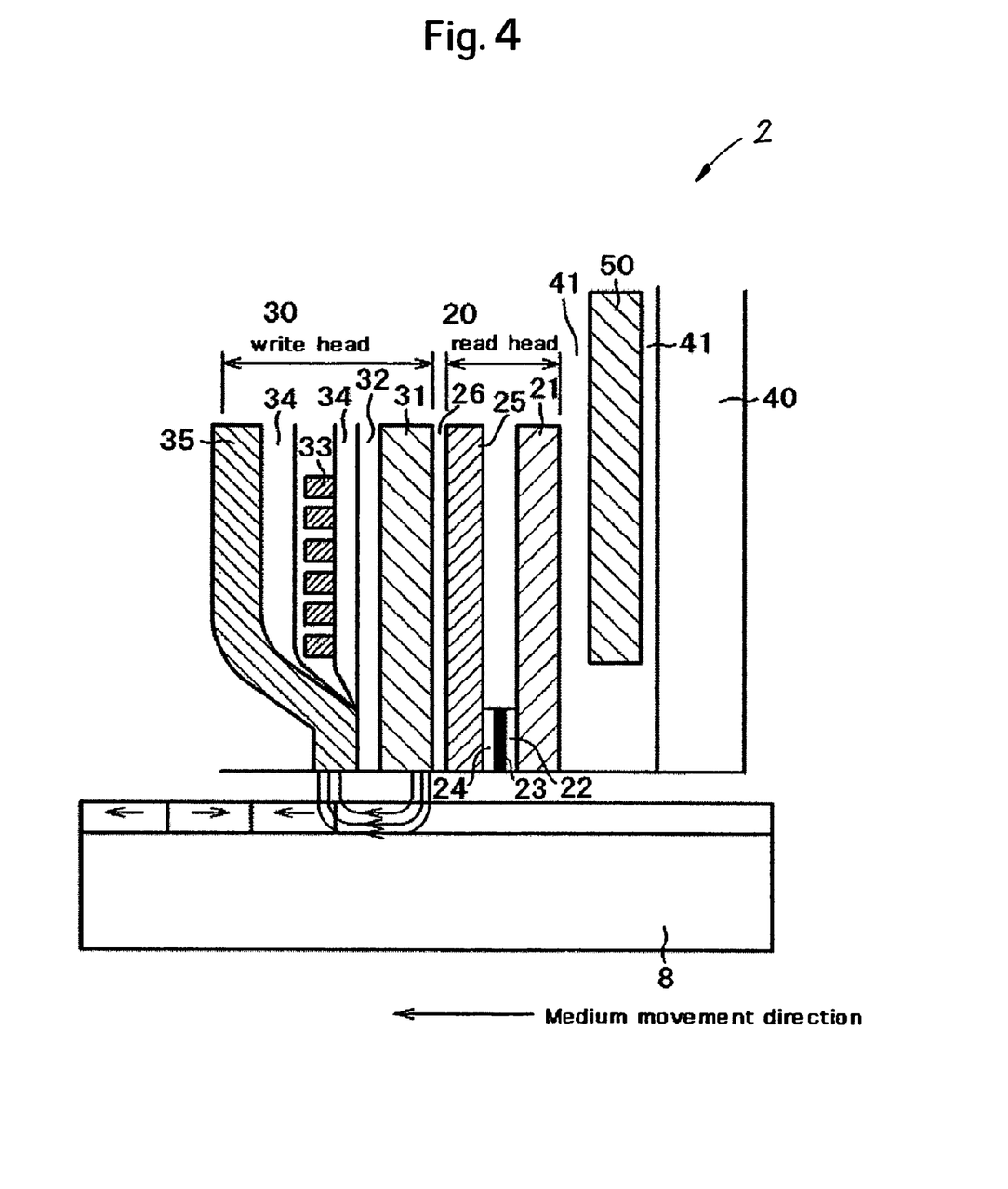
FIG. 4 is a view of the magnetic head of the longitudinal magnetic recording system provided with a TFC element, as viewed in the cross-sectional direction of the magnetic disk.

FIG. 4 is a view showing the cross-section of the magnetic head 2 provided with a heat-generating resistor or a heat element 50 for TFC (abbreviating Thermal Flyheight Control). An insulating layer 41 is laminated on the substrate 40, and further, the heat element 50 is placed on the insulating layer 41. The heat element 50 is covered with another insulating layer 41, on which the read head 20 and the write head 30 shown in FIG. 3 are formed. The heat element 50 is a single end driver whose one end is connected to a ground terminal. The other elements are the same as that shown in FIG. 3. In the above-described magnetic head, the heat element 50 is energized to heat the surroundings of the read head 20 and the write head 30 to expand thermally. In this way, controlling a projection thus formed toward the ABS surface controls distances between the read head 20 and the magnetic disk 8 and between the write head 30 and the magnetic disk 8.

Figure 5:
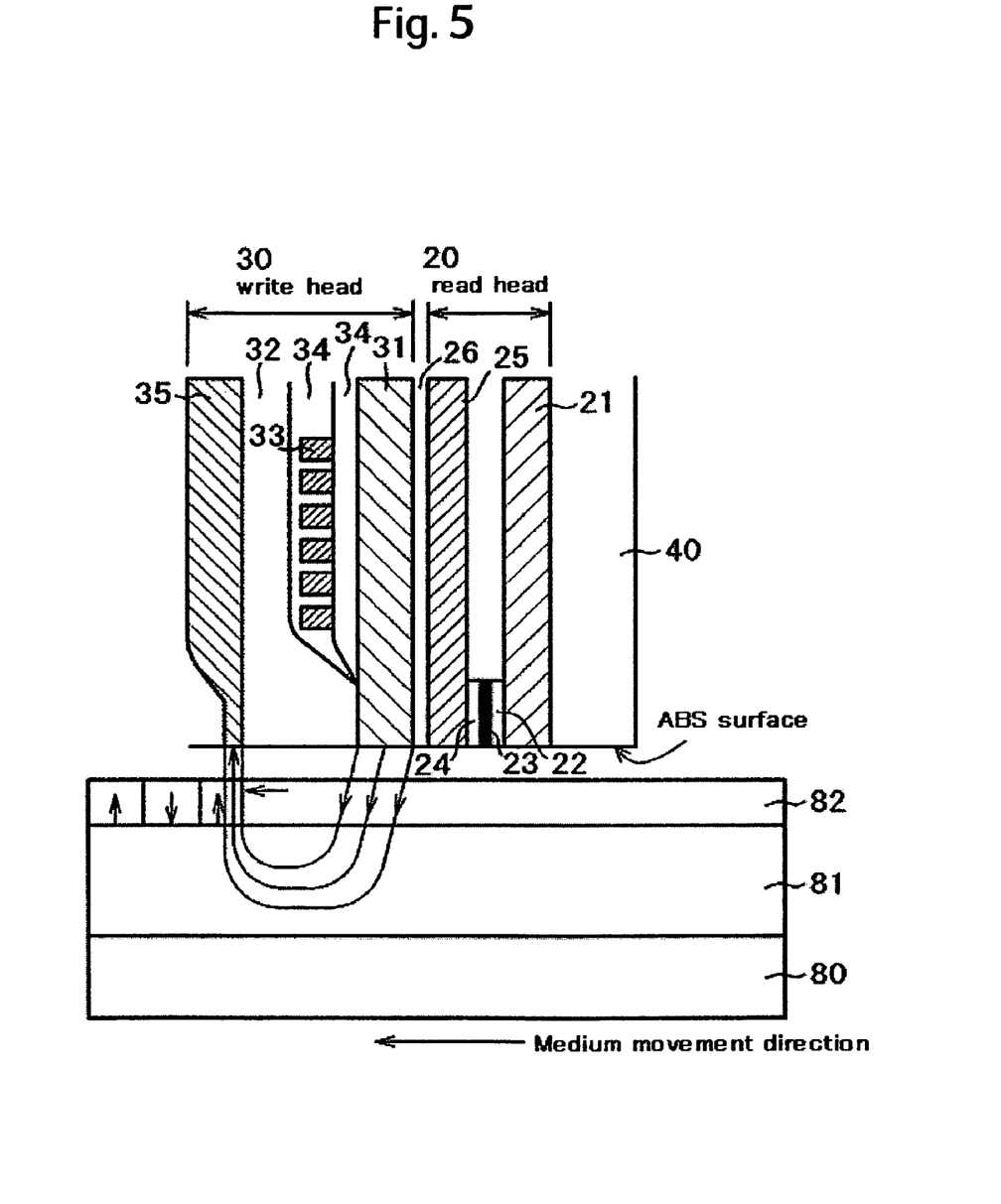
FIG. 5 is a view of a magnetic head of a perpendicular magnetic recording system, as viewed in the cross-sectional direction of the magnetic disk.

FIG. 5 is a view showing a magnetic head of a perpendicular magnetic recording system, as viewed in a cross-sectional direction of a magnetic disk. The read head 20 includes the magnetic read element 23 held between the lower gap layer 22 and the upper gap layer 24 put between the lower magnetic shield 21 and the upper magnetic shield 25 on the substrate (i.e., the slider) 40. The insulating separation layer 26 is laminated on the upper magnetic shield 25. The write head 30 includes the lower magnetic pole piece 31, the upper magnetic pole piece 35, the magnetic gap layer 32 interposed between the magnetic pole pieces 31 and 35 and defining the magnetic gap at the ABS surface facing the magnetic disk 8, and the coil 33 formed inside the interlayer insulating layers 34. Any or all of the slider 40, the GMR element 23, and the upper and lower magnetic shields 25 and 21 in the read head 20, and the upper and lower magnetic pole pieces 35 and 31 in the write head 30 are connected to the ground terminal, not shown, at a proper resistance of about 3 KΩ.

During write operation, a signal current is carried to the coil 33 to induce a magnetic flux to the lower magnetic pole piece 31 and the upper magnetic pole piece 35 with the magnetic flux leaking at the ABS surface. The magnetic flux leaking from the lower magnetic pole piece 31 is fed back to the upper magnetic pole piece 35 through a lower soft magnetic layer 81 on a magnetic disk 80. The magnetic flux perpendicularly magnetizes an orbital track on a recording layer 82 during the write operation. In contrast, during the read operation, the magnetic flux leaking from the magnetized region on the turning magnetic disk 80 is injected into the GMR element 23 in the read head, thereby causing a change in resistance inside the GMR element 23. The change in resistance is detected as a change in current or a change in voltage in the GMR element 23. Here, also in the magnetic head of the perpendicular magnetic recording system, the heat element 50 for TFC (Thermal Flyheight Control) may be interposed between the substrate 40 and the read head 20.

Figure 6:
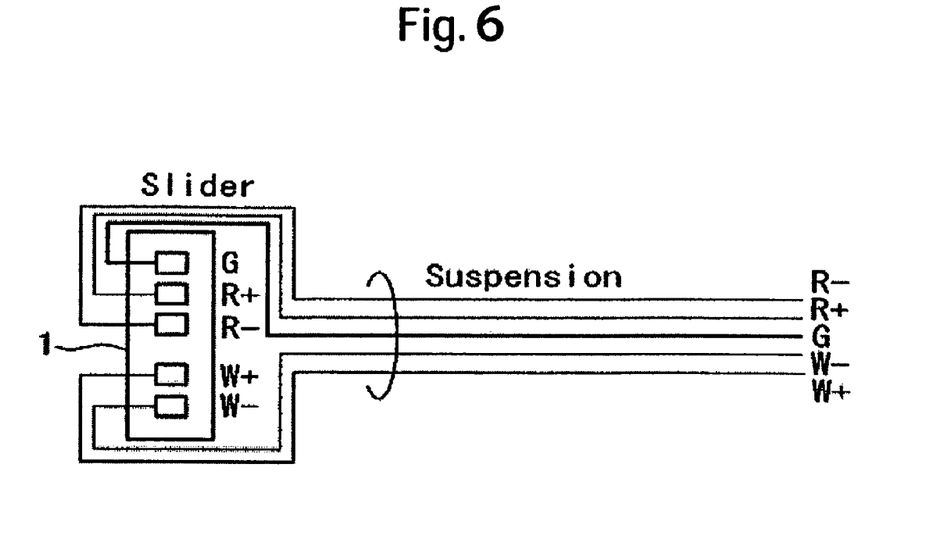
FIG. 6 is a diagram schematically showing a terminal arrangement structure and a wiring structure in a first embodiment.

Referring to FIG. 6, a description will be given below of a first embodiment of a terminal arrangement on the element-forming surface in the magnetic head slider 1 and a wiring structure on the suspension 4 for the magnetic head 2 shown in FIG. 3. The magnetic head 2 shown in FIG. 3 includes two lead wires from the read head 20, two lead wires from the write head 30 and one ground line, that is, five lead wires and ground line in total, and therefore, five terminals connected to these lead wires and ground line are required. Moreover, five lead wires and ground line connected to these terminals and wired on the suspension 4 are required. The terminal arrangement at the element-forming surface on the slider consists of a ground terminal G, a read terminal R+, a read terminal R−, a write terminal W+ and a write terminal W− in order from the outside. With this terminal arrangement, the wiring order on the suspension 4 is changed therefrom into the following: a read wire R−, a read wire R+, a ground line G, a write wire W− and a write wire W+. In other words, the ground line G is interposed between the write wires W and the read wires R. As a consequence, the wiring of the write wires W and the wiring of the read wires R are never arranged adjacently to each other, and further, the ground line G is interposed between the write wires W and the read wires R, thereby reducing crosstalk on the read wires R caused by the write current with a high frequency which flows in the write wires W.

Figure 7:
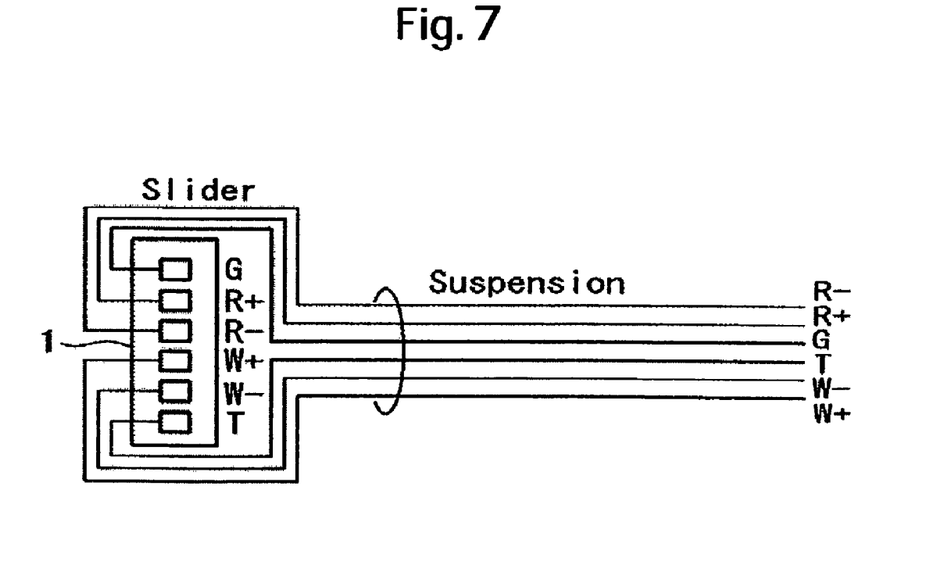
FIG. 7 is a diagram schematically showing a terminal arrangement structure and a wiring structure in a second embodiment.

FIG. 7 shows a second embodiment, illustrating a terminal arrangement on the element-forming surface in the magnetic head slider 1 and a wiring structure on the suspension 4 in the magnetic head 2 provided with the TFC element shown in FIG. 4. A difference from the above-described first embodiment resides in that there are additionally provided a terminal T for the heat element 50 constituting the TFC element and a TFC line T on the suspension 4. Also in this case, the terminal arrangement on the element-forming surface in the slider consists of the ground terminal G and the TFC terminal T arranged on both outer sides and the read terminals R and the write terminals W arranged between the terminals G and T so that the TFC line T and the ground line G may be located at the center on the suspension 4. Specifically, the order from one outer side is such that the ground terminal G, the read terminal R+, the read terminal R−, the write terminal W+, the write terminal W− and the TFC terminal T. The wiring order on the suspension 4 is changed from the terminal order into the following: the read wire R−, the read wire R+, the ground line G, the TFC line T, the write wire W− and the write wire W+. In this manner, the ground line G and the TFC line T are interposed between the write wires W and the read wires R. As a consequence, the wiring of the write wires W and the wiring of the read wires R are never arranged adjacently to each other, and further, the ground line G and the TFC line T are interposed between the write wires W and the read wires R, thereby reducing crosstalk on the read wires R caused by the writing current of a high frequency which flows in the write wires W.

Figure 8:
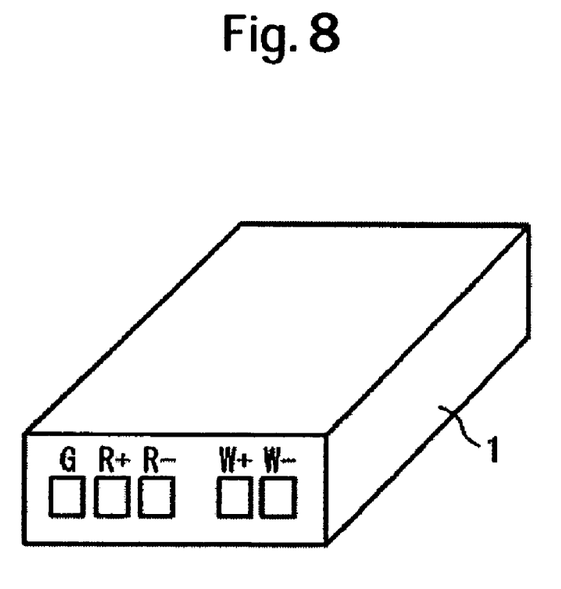
FIG. 8 is a view showing one example of the terminal arrangement structure corresponding to FIG. 6.
Figure 9:
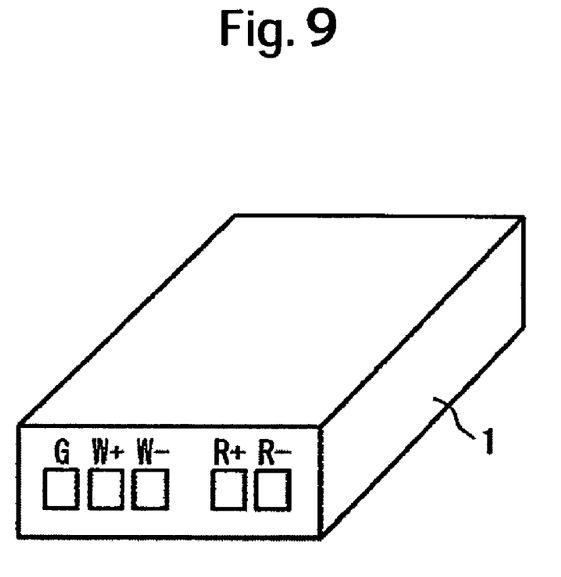
FIG. 9 is a view showing another example of the terminal arrangement structure.
Figure 10:
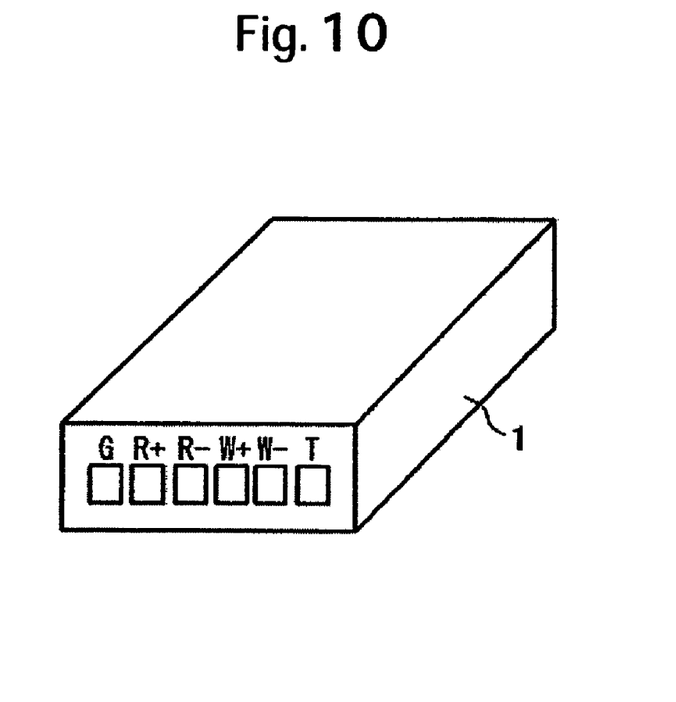
FIG. 10 is a view showing a further example of the terminal arrangement structure corresponding to FIG. 7.
Figure 11:
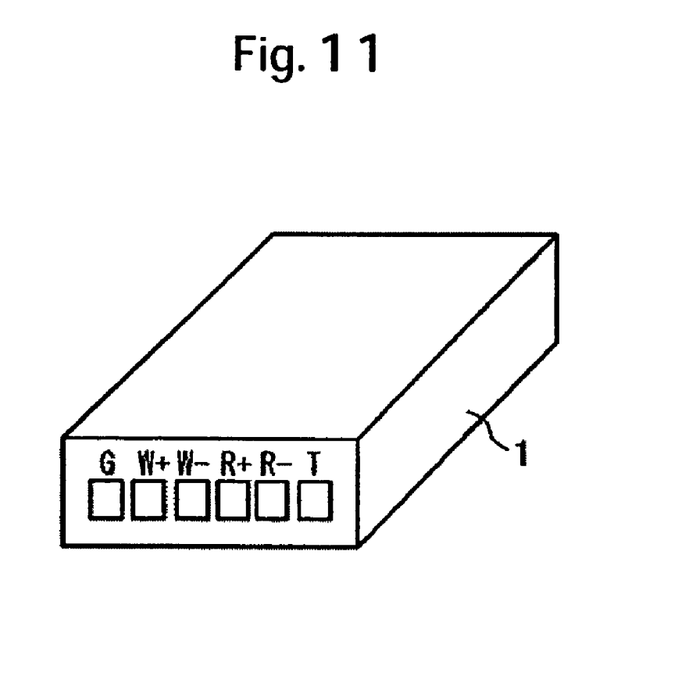
FIG. 11 is a view showing a still further example of the terminal arrangement structure.

Next, an explanation will be made below of specific examples of the terminal arrangement structure on the element-forming surface in the magnetic head slider 1 in reference to FIGS. 8 to 11. FIG. 8 is a view of the magnetic head slider 1, as viewed from the element-forming surface, corresponding to FIG. 6, wherein the terminal arrangement consists of the ground terminal G, the read terminal R+, the read terminal R−, the write terminal W+ and the write terminal W− in order from the left. FIG. 9 shows another example, in which the terminal arrangement consists of the ground terminal G, the write terminal W+, the write terminal W−, the read terminal R+ and the read terminal R− in order from the left. FIG. 10 shows a further example corresponding to FIG. 7, wherein the terminal arrangement consists of the ground terminal G, the read terminal R+, the read terminal R−, the write terminal W+, the write terminal W− and the TFC terminal T in order from the left. FIG. 11 shows a still further example, in which the terminal arrangement consists of the ground terminal G, the write terminal W+, the write terminal W−, the read terminal R+, the read terminal R− and the TFC terminal T in order from the left.

Incidentally, a corrosion resistant pad, an element machining detecting pad or the like may be additionally provided in the above-described terminal arrangement structures. In this case, the ground terminal is arranged at an outermost position among the read terminal, the write terminal and the ground terminal, or is arranged at an outermost position among the read terminal, the write terminal, the TFC terminal and the ground terminal.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head slider comprising:
   a substrate;
   a heat element formed on the substrate via an insulating layer;
   a magnetic read element and a magnetic write element formed on the heat element via the insulating layer; and
   a terminal arrangement structure including a first terminal for wiring the magnetic read element, a second terminal for wiring the magnetic write element, a third terminal for wiring the heat element, and a ground terminal for a ground line with respect to any or all of the substrate, the magnetic read element, the magnetic write element and the heat element;
   wherein the ground terminal and the third terminal are arranged on both sides of the first and second terminals, respectively, in the terminal arrangement structure.

2. A magnetic head slider as claimed in claim 1, wherein the terminal arrangement structure includes two first terminals, two second terminals, one third terminal, and one ground terminal.

3. A magnetic head slider as claimed in claim 1, wherein the first, second, third and ground terminals are arranged in a line, the ground terminal and the third terminal being arranged on both sides of the arrangement of the first and second terminals, respectively.

4. A magnetic head slider as claimed in claim 1, wherein the magnetic head slider is configured for longitudinal magnetic recording.

5. A magnetic head slider as claimed in claim 1, wherein the magnetic head slider is configured for perpendicular magnetic recording.

6. A magnetic head assembly comprising:
   a magnetic head slider including:
   a substrate;
   a heat element formed on the substrate via an insulating layer;
   a magnetic read element and a magnetic write element formed on the heat element via the insulating layer; and
   a terminal arrangement structure having a first terminal for wiring the magnetic read element, a second terminal for wiring the magnetic write element, a third terminal for wiring the heat element, and a ground terminal for a ground line with respect to any or all of the substrate, the magnetic read element, the magnetic write element and the heat element, the ground terminal and the third terminal being arranged on both sides of the first and second terminals; and
   a suspension including a wiring structure for guiding a first wiring to be connected to the first terminal, a second wiring to be connected to the second terminal, a third wiring to be connected to the third terminal and a ground line to be connected to the ground terminal in the magnetic head slider and separating the first wiring from the second wiring by locating the ground line and the third wiring between the first wiring and the second wiring.

7. A magnetic head assembly as claimed in claim 6, wherein the terminal arrangement structure includes two first terminals, two second terminals, one third terminal, and one ground terminal.

8. A magnetic head assembly as claimed in claim 6, wherein the first, second, third and ground terminals are arranged in a line, the ground terminal and the third terminal being arranged on both sides of the arrangement of the first and second terminals, respectively.

9. A magnetic head assembly as claimed in claim 6, wherein the magnetic head slider is configured for longitudinal magnetic recording.

10. A magnetic head assembly as claimed in claim 6, wherein the magnetic head slider is configured for perpendicular magnetic recording.

* * * * *